United States Patent
Murphy et al.

(10) Patent No.: US 6,845,393 B1
(45) Date of Patent: Jan. 18, 2005

(54) LOOKUP DISCOVERY SERVICE IN A DISTRIBUTED SYSTEM HAVING A PLURALITY OF LOOKUP SERVICES EACH WITH ASSOCIATED CHARACTERISTICS AND SERVICES

(75) Inventors: Brian T. Murphy, Milford, NH (US); Robert W. Scheifler, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/441,458

(22) Filed: Nov. 17, 1999

Related U.S. Application Data

(60) Provisional application No. 60/138,680, filed on Jun. 14, 1999.

(51) Int. Cl.[7] ............................................. G06F 15/177
(52) U.S. Cl. ...................... 709/220; 709/201; 709/221; 709/222; 709/223; 709/224; 709/225; 709/226; 709/227; 709/228; 709/229
(58) Field of Search ................................. 709/201, 220, 709/221, 222, 223, 224, 225, 226, 227, 228, 229

(56) References Cited

U.S. PATENT DOCUMENTS

| | | | |
|---|---|---|---|
| 4,430,699 A | 2/1984 | Segarra et al. | |
| 4,491,946 A | 1/1985 | Kryskow, Jr. et al. | |
| 4,558,413 A | 12/1985 | Schmidt et al. | |

(List continued on next page.)

FOREIGN PATENT DOCUMENTS

| | | |
|---|---|---|
| EP | 0 865 180 A2 | 9/1998 |
| EP | 0 892 530 A2 | 1/1999 |
| WO | WO99/17194 | 4/1999 |
| WO | WO01/13228 A2 | 2/2001 |
| WO | WO01/86394 A2 | 11/2001 |
| WO | WO01/90903 A1 | 11/2001 |

OTHER PUBLICATIONS

H.A. Smith and J.D. McKeen, "Object–Oriented Technology: Getting Beyond the Hype," ACM, Spring 1996, vol. 27, pp. 20–29.

(List continued on next page.)

*Primary Examiner*—Nabil El-Hady
(74) *Attorney, Agent, or Firm*—Finnegan, Henderson, Farabow, Garrett & Dunner, L.L.P.

(57) ABSTRACT

A lookup discovery service is provided that continuously monitors associated lookup services and provides information on lookup services of interest to registered clients. This lookup discovery service is a third party server that can be used by a client to perform the client's discovery duties. Thus, if a lookup service does not provide access to a particular network service of interest inside of the client's multicast radius, the client can query a lookup discovery service to identify qualified lookup services anywhere on the enterprise. Additionally, the lookup discovery service provides an event mechanism with notification semantics that allows the client to be notified of the arrival of new lookup services of interest as well as certain changes in the state of the current lookup services (discarded, rediscovered, etc.) on the network.

27 Claims, 7 Drawing Sheets

U.S. PATENT DOCUMENTS

| | | |
|---|---|---|
| 4,567,359 A | 1/1986 | Lockwood |
| 4,713,806 A | 12/1987 | Oberlander et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,109,486 A | 4/1992 | Seymour |
| 5,187,787 A | 2/1993 | Skeen et al. |
| 5,218,699 A | 6/1993 | Brandle et al. |
| 5,253,165 A | 10/1993 | Leiseca et al. |
| 5,257,369 A | 10/1993 | Skeen et al. |
| 5,293,614 A | 3/1994 | Ferguson et al. |
| 5,297,283 A | 3/1994 | Kelly et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,435 A | 8/1994 | Lubkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,459,837 A | 10/1995 | Caccavale |
| 5,475,840 A | 12/1995 | Nelson et al. |
| 5,511,196 A | 4/1996 | Shackelford et al. |
| 5,544,040 A | 8/1996 | Gerbaulet |
| 5,548,724 A | 8/1996 | Akizawa et al. |
| 5,592,375 A | 1/1997 | Salmon et al. |
| 5,644,720 A | 7/1997 | Boll et al. |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,675,796 A | 10/1997 | Hodges et al. |
| 5,675,797 A * | 10/1997 | Chung et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara |
| 5,710,887 A | 1/1998 | Chelliah et al. |
| 5,715,314 A | 2/1998 | Payne et al. |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cetjin et al. |
| 5,754,849 A | 5/1998 | Dyer et al. |
| 5,757,925 A | 5/1998 | Faybishenko |
| 5,758,077 A | 5/1998 | Danahy et al. |
| 5,758,328 A | 5/1998 | Giovannoli |
| 5,761,656 A | 6/1998 | Ben-Schachar |
| 5,764,897 A | 6/1998 | Khalidi |
| 5,768,532 A | 6/1998 | Megerian |
| 5,774,729 A | 6/1998 | Carney et al. |
| 5,778,179 A | 7/1998 | Kanai et al. |
| 5,790,677 A | 8/1998 | Fox et al. |
| 5,794,207 A | 8/1998 | Walker et al. |
| 5,799,173 A | 8/1998 | Gossler et al. |
| 5,805,805 A | 9/1998 | Civanlar et al. |
| 5,809,144 A | 9/1998 | Sirbu et al. |
| 5,845,090 A | 12/1998 | Collins, III et al. |
| 5,850,442 A | 12/1998 | Muftic |
| 5,913,029 A | 6/1999 | Shostak |
| 5,933,647 A | 8/1999 | Aronberg et al. |
| 5,949,998 A | 9/1999 | Fowlow et al. |
| 5,951,652 A | 9/1999 | Ingrassia, Jr. et al. |
| 5,961,582 A | 10/1999 | Gaines |
| 5,963,924 A | 10/1999 | Williams et al. |
| 5,963,947 A | 10/1999 | Ford et al. |
| 5,974,201 A | 10/1999 | Chang et al. |
| 5,982,773 A | 11/1999 | Nishimura et al. |
| 5,991,808 A | 11/1999 | Broder et al. |
| 5,996,075 A | 11/1999 | Matena |
| 5,999,988 A | 12/1999 | Pelegri-Llopart et al. |
| 6,003,050 A | 12/1999 | Silver et al. |
| 6,009,413 A | 12/1999 | Webber et al. |
| 6,052,761 A | 4/2000 | Hornung et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,104,716 A | 8/2000 | Crichton et al. |
| 6,108,346 A | 8/2000 | Doucette et al. |
| 6,154,844 A | 11/2000 | Touboul et al. |
| 6,157,960 A | 12/2000 | Kaminsky et al. |
| 6,185,602 B1 | 2/2001 | Bayrakeri |
| 6,185,611 B1 * | 2/2001 | Waldo et al. ............... 709/221 |
| 6,189,046 B1 | 2/2001 | Moore et al. |
| 6,199,116 B1 | 3/2001 | May et al. |
| 6,212,578 B1 | 4/2001 | Racicot et al. |
| 6,216,138 B1 | 4/2001 | Wells et al. |
| 6,216,158 B1 | 4/2001 | Luo et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,272,559 B1 | 8/2001 | Jones et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,343,308 B1 | 1/2002 | Marchesseault |
| 6,385,643 B1 | 5/2002 | Jacobs et al. |
| 6,408,342 B1 | 6/2002 | Moore et al. |
| 6,578,074 B1 | 6/2003 | Bahlmann |
| 6,654,793 B1 | 11/2003 | Wollrath et al. |

OTHER PUBLICATIONS

Java Remote Method Invocation Specification, JDK 1.1 FCS, Sun Microsystems, Inc. Feb. 1997, chapter 5 and 7.

Jennings, N.R. et al., "Using Intelligent Agents to Manage Business Processes," Dept. Electronic Engineering, Queen Mary & Westfield College, Mile End Road, London, E1 4NS, U.K., XP002254546, 1996, 16 pages.

"Consumers Can View, Share Picture On–Lines as Kodak Picture Network Goes 'Live'," Business Wire, Aug. 25, 1997, pp. 18–19.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Annouces Internet Access,", Boardwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", Retailtech, The Technology Magazine for Retail Executives, Apr. 1997.

Foley, "Managing Campus–Wind Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Keller, "Smart Catalogs and Virtual Catalogs," Proceedings of the First USENIX Workshop of Electronic Commerce, USENIX Association, Jul. 11–12, 1995, pp. 125–131.

Klein et al., "TRADE'ex: The Stock Exchange of the Computer Industry," Harvard Business School Publishing, 1996, pp. 1–14.

Kodak PhotoNet FAQ, PhotoNet Online, Jun. 14, 2002, pp. 1–3.

Kramer, "NETWATCH; The AJC's Daily Online Guide; Get the picture: Kodak will send photos to Web," The Atlanta Journal and Constitution, Sec. Features, p. 08C, Jun. 5, 1997.

Lampson et al., "Authentication in Distributed System: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing; Launches PhotoNet online digital photography and imaging services," Photographic Trade News, Sec. p. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your furture?," Database Searcher, vol. 5, No. 6, p. 18.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information System Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening Internet market, secure system and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishing, 1996.

Osborn, "The Role of Polymorphism in Schema Evolution in an Object–Oriented Database," IEEE Transactions on Knowledge and Data Engineering, vol. 1, No. 3, Sep. 1989, pp. 310–317.

Kolodner et al., "Atomic Garbage Collection: Managing a Stable Heap," ACM, 1989, pp. 15–25.

Hodges, Douglas, "Managing Object Lifetimes in OLE," Aug. 25, 1994, pp. 1–41.*

Sun Microsystems, "Jini™ Discovery and Join Specification," Jini Specifications 1.0 (Jan. 25, 1999).

Sun Microsystems, "Jini™ Architectural Overview," Technical White Paper (Jan. 1999).

Sandholm, "Object Caching in a Transactional, Object–Relational CORBA Environment," Dept. of Computer and Systems Sciences, University of Stockholm (Oct. 1998).

Sandholm, et al., "Design of Object Catching in a CORBA OTM System" (Jun. 11, 1999).

Sun Microsystems, Inc., "Jini™ Distributed Event Specification," Jini 1.0 Specifications (Jan. 25, 1999).

Sun Microsystems, Inc., "Jini™ Lookup Service Specification," Jini 1.0 Specifications (Jan. 25, 1999).

Venners, "FAQ and Links to Resources," Jini–Users Mailing List Archives (Apr. 30, 1999).

* cited by examiner

LOOKUP DISCOVERY SERVICE IN A DISTRIBUTED SYSTEM HAVING A PLURALITY OF LOOKUP SERVICES EACH WITH ASSOCIATED CHARACTERISTICS AND SERVICES

RELATED APPLICATIONS

The following applications are relied upon and are hereby incorporated by reference in this application: U.S. Provisional Application No. 60/138,680, entitled "Jini™ Technology Helper Utilities and Services," filed Jun. 14, 1999 U.S. patent application Ser. No. 09/044,931 entitled "Dynamic Lookup Service in a Distributed Systems," filed on Mar. 20, 1998, now U.S. Pat. No. 6,185,611 issued Feb. 6, 2001. U.S. patent application Ser. No. 09/044,939, entitled "Apparatus and Method for Providing Downloadable Code for Use in Communicating with a Device in a Distributed System," filed on Mar. 20, 1998, now U.S. Pat. No. 6,560,656 issued May 6, 2003. U.S. patent application Ser. No. 09/030 840, entitled "Method and Apparatus for Dynamic Distributed Computing Over a Network," filed on Feb. 26, 1998, now U.S. Pat. No. 6,446,070 issued Sep. 3, 2002.

FIELD OF THE INVENTION

The present invention relates to a system and method for communicating with a device in a distributed system and more particularly to a system and method for utilizing a third party server to facilitate communication between devices on a network.

BACKGROUND OF THE INVENTION

Before devices can communicate and share resources with each other in a modern distributed computing environment, each remote terminal or client, must have a reference identifier for the target device (printer, mass storage device, telephony interface, etc.). The reference identifier essentially contains sufficient addressing information to direct the client to the target device. In essence, the other devices on the distributed network must have access to code, device drivers, and interface port information for any other device that joins the network. In one conventional distributed system, services are logically grouped in a distributed Jini™ system, referred to as a "Djinn" as described in copending U.S. patent application Ser. No. 09/044,931, now U.S. Pat. No. 6,185,611 issued Feb. 6, 2001, entitled "Dynamic Lookup Service in a Distributed System," assigned to a common assignee, which has been previously incorporated by reference. A "service" refers to a resource, data, or functionality that can be accessed by a user, program, device, or another service and that can be computational, storage related, communication related, or helpful in providing access to another user. Examples of services provided as part of a Djinn include devices, such as printers, displays, and disks; software, such as applications or utilities; information, such as databases and files; and users of the system. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java™ programming environment, which may include other objects, software components written in different programming languages, or hardware devices.

The goal of any well-behaved Jini service, implemented within the bounds defined by the Jini technology programming model, is to advertise the service it provides in at least one Jini Lookup service. Such a process is known as registering with, or joining the lookup. To demonstrate this so-called good behavior, a service complies with both the multicast discovery protocol (group discovery) and the unicast discovery protocol (locator discovery) in order to discover the lookup services it is interested in joining. In brief, a service wishing to register in a lookup service first sends a multicast message on the network, which is responded to by a discovery server. Each discovery server receiving the message responds with a reference to an associated lookup service. After receiving this response, the service may register itself in the lookup service by sending a unicast message to the lookup service. Once registered, the service receives a lease object from the lookup service indicating that that service will be registered for a particular period of time. It is the responsibility of the service to renew this lease before it expires, otherwise its registration will be deleted. Leases are further described in co-pending U.S. patent application Ser. No. 09/044,923, now U.S. Pat. No. 6,753,350 issued Jul. 17, 2001, entitled "Method and System for Leasing Storage," assigned to a common assignee, which has been previously incorporated by reference.

In order to efficiently utilize existing memory space and to conserve processing power, a service may be implemented as an activatable object. That is, the service may be selectively activated (stored in memory) or deactivated (removed from memory), depending upon whether it is currently being used by another network service. Both the service and the lookup service are activatable objects, thus posing a problem. Specifically, for a service to register with a lookup service, both the service and the lookup service must be active and operational, respectively. If not, the service either will not be looking for the lookup service because it is inactive, or it will not be able to find the lookup service because the lookup service has crashed. Based on these problems, it is desirable to improve the process and apparatus for performing lookup service registration.

SUMMARY OF THE INVENTION

Methods and systems consistent with the present invention provide a lookup discovery service that solves the problem encountered by conventional systems. Specifically, on behalf of client or service entities, the lookup discovery service locates lookup services that the entities cannot locate themselves; either because the lookup service is out of reach, or the entity is inactive. In providing a service with access to lookup services beyond its reach, the lookup discovery service enables a service to register with lookup services outside of its multicast radius. While multicast radii can and often do overlap, a multicast broadcast transmitted by an entity will only reach those lookup services within the entity's multicast radius. Referring to FIG. 1, it is shown that multicast radius 80 is comprised of client 50, lookup services 71 and 72, and lookup discovery service 95. Multicast radius 85 is comprised of lookup discovery service 95 and lookup services 73, 74 and 75. A multicast broadcast transmitted by client 50 will only reach those entities located inside of multicast radius 80. However, as a result of its location, multicast broadcasts by lookup discovery service 95 will reach all entities located inside multicast radius 80 as well as those located inside multicast radius 85. Link 60 indicates that client 50 has discovered lookup service 71. Link 90 indicates that lookup discovery service 95 has discovered lookup services 71, 73 and 74 and that client 50 has acquired a reference to lookup discovery service 95 through lookup service 71. Links connecting lookup services 72 and 75 with either client 50 or lookup discovery service 95, were omitted simply to illustrate the fact that clients, lookup discovery services and lookup services located inside the same multicast radius may, but do not necessarily have to discover each other. As will be shown later, an entity that has not been discovered can not access resources located in another entity.

If client 50 were provided with references to lookup services located outside of its multicast radius 80 that contain services needed by the client, it could contact each lookup service and retrieve the desired service references despite the fact that such services aren't available inside its multicast radius 80. One way to achieve this might be to configure the client 50 to find and access lookup discovery service 95 which would employ the multicast discovery protocol to discover nearby lookup services belonging to groups in which the client has expressed interest. After acquiring references to the targeted lookup services, the lookup discovery service 95 would pass those references back to client 50, providing it with access to each lookup service. In this way, client 50 participates in the multicast discovery protocol through a proxy relationship with the lookup discovery service 95, gaining access not only to each discovered lookup services 71–75 but also to all of their registered services.

Systems consistent with the present invention provide a lookup discovery service that continuously monitors associated lookup services and provides information about lookup services of interest to registered clients. Lookup discovery services in effect provide the capability for clients to maintain a more complete representation of available lookup services and in turn, network services. As a result, clients gain access to a more comprehensive collection of services than with prior art systems. Lookup discovery services will further provide clients with first time, automated access to network services located outside of the client's multicast radius. Thus, if a service is not registered with a lookup service that is inside of the client's multicast radius, the client can query a lookup discovery service to identify lookup services, located elsewhere on the network, with which the service of interest may be registered. Additionally, the lookup discovery service provides an event mechanism with notification semantics that allows the client to be notified of the arrival of new lookup services of interest as well as any changes in the state of the current lookup services on the network.

In order for the lookup discovery service to be able to link an entity with lookup services in the way described above, the lookup discovery service must be registered with a lookup service having a location that is either known to the entity, or within the multicast radius of the entity. Furthermore, the lookup discovery service must be running on a host that is located within the multicast radius of the lookup services with which the entity wishes to be linked. That is, the entity must be able to find the lookup discovery service; and the lookup discovery service must be able to find the other desired lookup services. Referring again to FIG. 1, it is shown that lookup discovery service 95 has discovered lookup services 71, 73 and 74, and that the client 50 is registered with the lookup discovery service 95. Client 50, utilizing the functionality of lookup discovery service 95 can access lookup services 71, 73 and 74. Client 50, however, may not access lookup services 72 or 75 until those services are first discovered by lookup discovery service 95 and their references are passed to the client 50. Note that since client 50 and lookup service 72 are inside the same multicast radius 80, client 50 may independently discover lookup service 72 utilizing the process disclosed in previously referenced application entitled, "Apparatus and Method for Providing Downloadable Code for Use in Communicating with a Device in a Distributed System." Without the assistance of lookup discovery service 95, client 50 could only discover lookup service 75 via unicast discovery. In other words, unless lookup discovery service 95 discovers lookup service 75, client 50 could only access that lookup service if it was otherwise in possession of the lookup service's unique locator information.

To address scenarios such as those described above, the lookup discovery service participates in both the multicast discovery protocol and the unicast discovery protocol on behalf of a registered discovering entity or client. The lookup discovery service will listen for and process multicast announcement packets from Jini Lookup services, and will, until successful, repeatedly attempt to discover specific lookup services that the client is interested in accessing.

Upon discovery of an as yet undiscovered lookup service of interest, the lookup discovery service notifies all entities that have requested the discovery of that lookup service, that such an event has occurred. The event mechanism employed by the lookup discovery service satisfies the requirements defined in the previously referenced, co-pending U.S. application Ser. No. 09/044,790 entitled "Method and Apparatus for Determining Status of Remote Objects in a Distributed System," which has been incorporated by reference. Once a client is notified of the discovery of a lookup service, it is left to the client to define the semantics of how it interacts with that lookup service. For example, the client entity may wish to join the lookup service or simply query it for other useful services (or both).

In accordance with methods consistent with the present invention, a method is provided in a data processing system having a lookup discovery service for accessing associated lookup services. This method receives a client request by the lookup discovery service to identify lookup services and returns the location of a lookup service of interest.

In accordance with methods consistent with the present invention, another method is provided in a data processing system having a client computer, a lookup discovery service for accessing associated lookup services, and a lookup service containing service stubs for accessing associated network services. This method transmits a request from the client to the lookup discovery service, identifying one of the associated lookup services to be accessed. Then through participation in the discovery process, the lookup discovery service retrieves the locator information for the lookup service and returns that locator information to the client.

In accordance with systems consistent with the present invention, an apparatus is provided that comprises a lookup service, a lookup discovery service having access information for a plurality of lookup services, and a client having a program that sends out requests for lookup services to an associated lookup discovery service that accesses associated lookup services and returns lookup service locator information that facilitates access by the client to the identified lookup service.

In accordance with yet another aspect of the present invention, as embodied and broadly described herein, a computer program product comprises a computer usable medium having computer readable code embodied therein for controlling a data processing system having a lookup service with associated network services available in a distributed system, a lookup discovery service having locator IDs to a plurality of lookup services, and a client. The code comprises the steps of sending a request to identify locator information for a desired lookup service to a lookup discovery service; searching lookup services associated with the lookup discovery service to identify a lookup service that satisfies the client's request; and returning the locator information of the lookup service to the client.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Overview of the Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. Reference will be made to programs provided in the Java programming language, as described in James Gosling, Bill Joy, Guy Steele, "The Java Language Specification," Addison-Wesley, 1996, (hereinafter referred to as the "Java language specification"), incorporated herein by reference, which are processed in connection with an execution environment which is provided by a Java virtual machine. The Java virtual machine, in turn, is specified in the Lindholm and Yellin, "The Java Virtual Machine Specification," Addison-Wesley, 1996, incorporated herein by reference. As described in the Java language specification, programs in the Java programming language define "classes" and "interfaces." A "class" is a template from which an object can be created. It is used to specify the behavior and attributes common to all objects of the class. The mechanism by which new classes are defined from existing classes is "inheritance." It is the mechanism by which code reusability is facilitated. "Subclasses" of a class inherit operations of their parent or "superclass". An interface specifies the set of methods that must be implemented by any class that implements that interface (but does not provide any implementation of these methods itself). More specifically, the Java programming language provides for declarations wherein a user declares variables of type I, where I is an interface. Such variables, referred to as interface references, can store a reference to an object of any class that implements the interface I. Interface references can also be used to invoke any of the methods declared in the interface declaration. Importantly, the Java programming language provides for multiple inheritance among interfaces, i.e., an interface may extend multiple interfaces. Also, a class can implement multiple interfaces.

Figure 1:
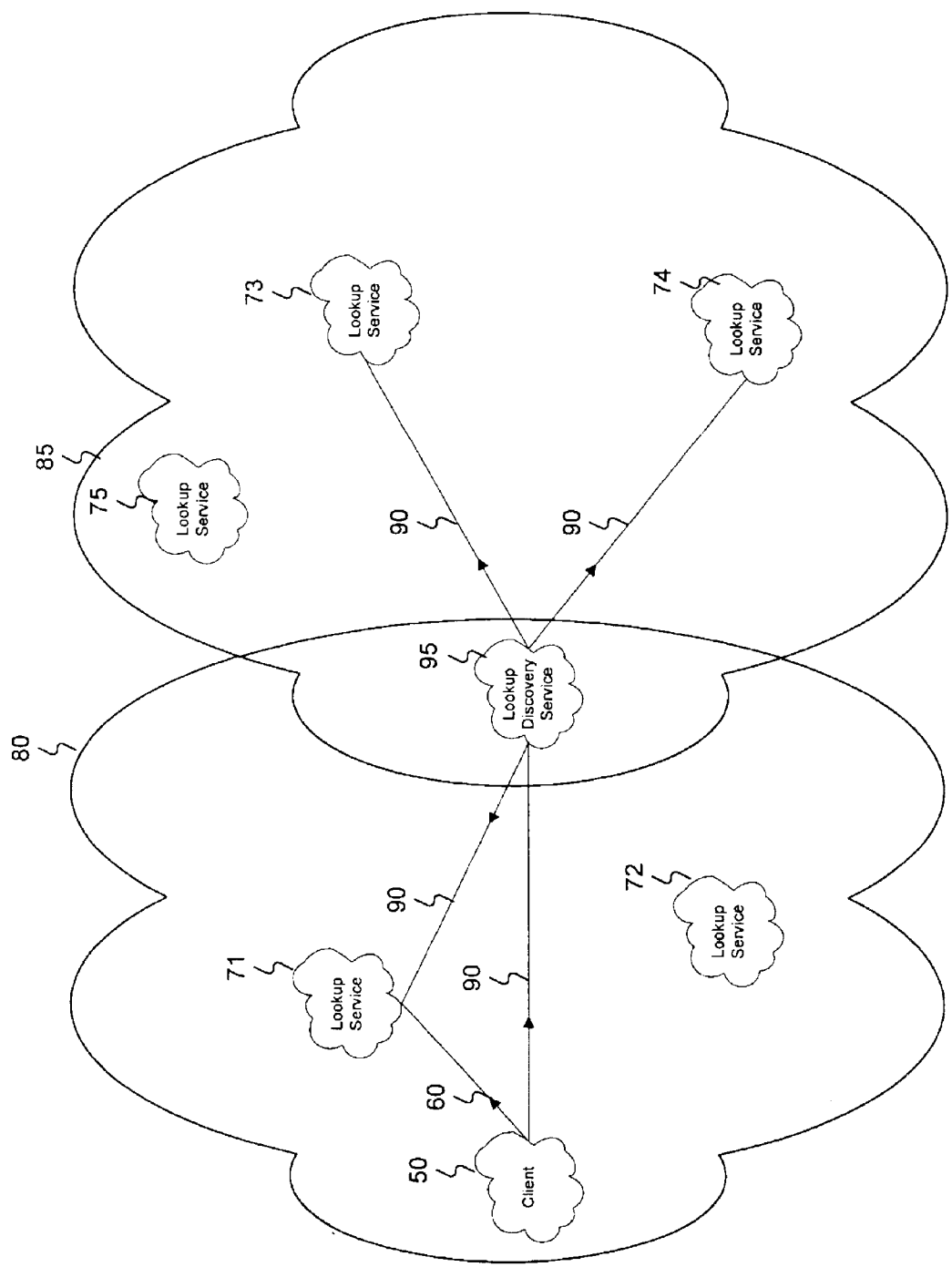
FIG. 1 depicts of a typical distributed network.
Figure 2:
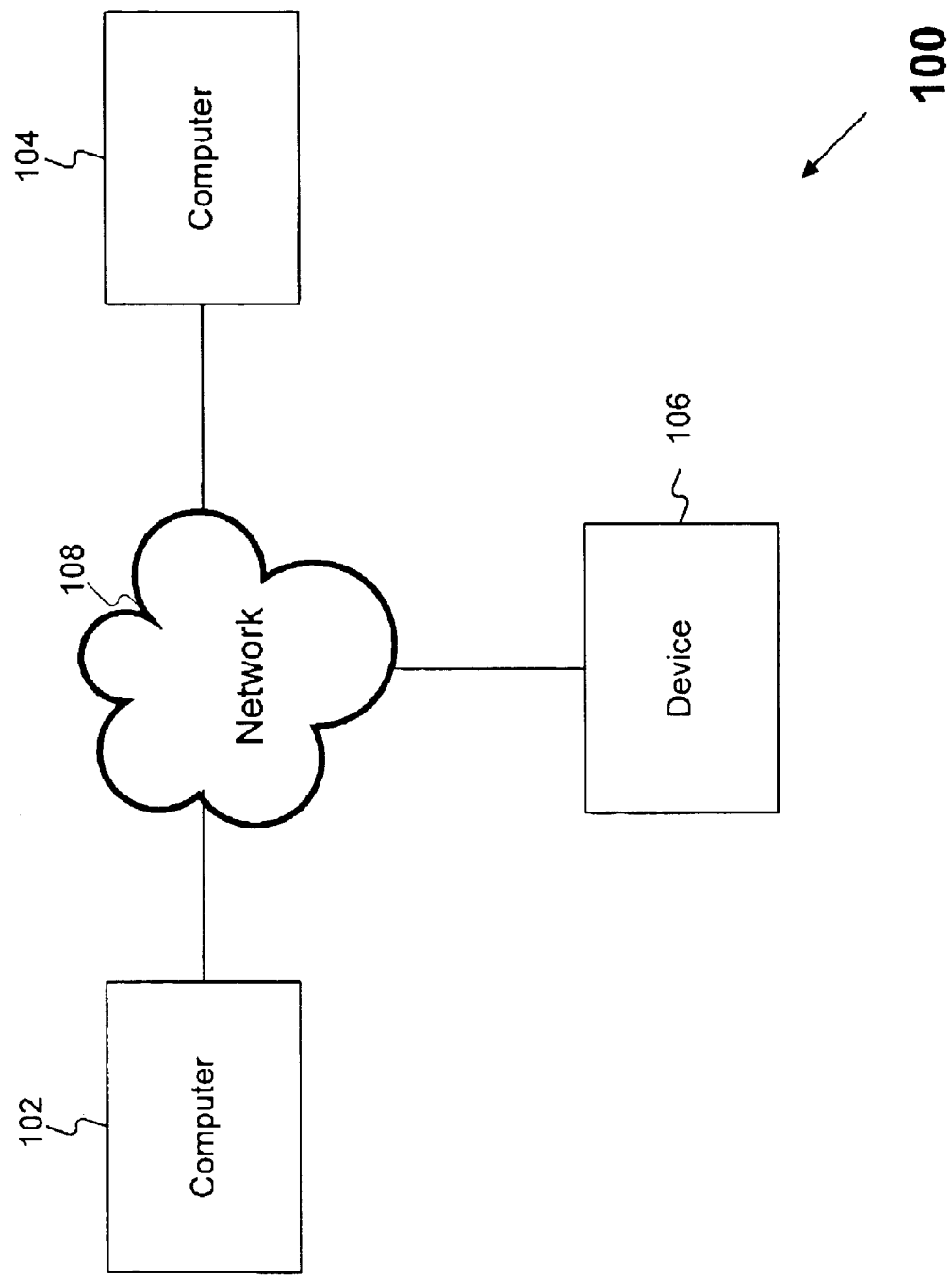
FIG. 2 depicts a distributed system suitable for practicing methods and systems consistent with the present invention.

FIG. 2 depicts the exemplary distributed system 100 containing a server computer 102, a client computer 104, and a device 106 interconnected by a network 108. It will be appreciated that a client computer may also perform operations described herein as being performed by a server computer, and similarly a server computer may also perform operations described herein as being performed by a client computer. Moreover, the device 106 may be any of a number of devices, such as a printer, fax machine, storage device, input device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or devices.

Figure 3A:
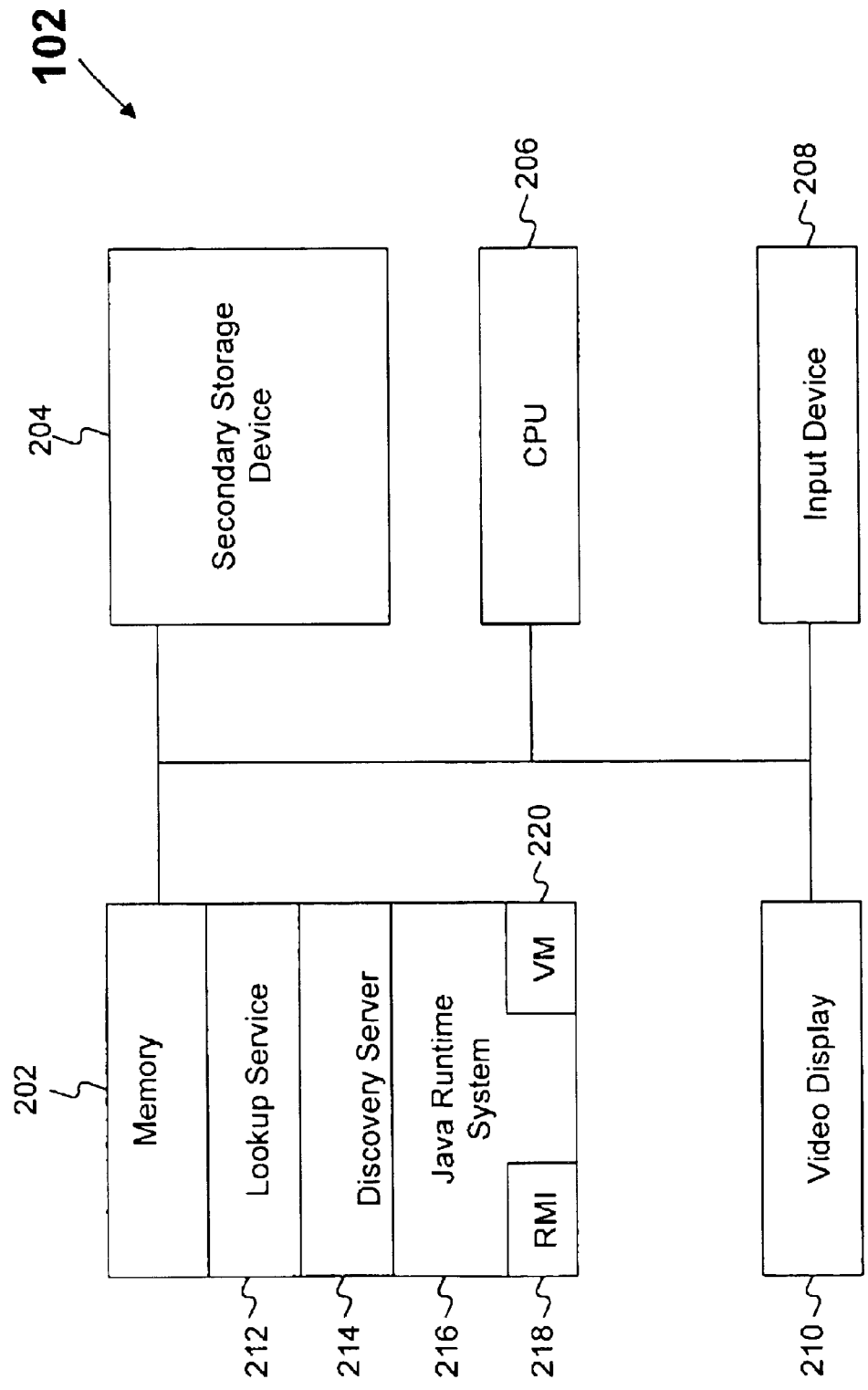
FIG. 3a depicts a more detailed block diagram of a computer depicted in FIG. 2.

FIG. 3a depicts the server computer 102 in greater detail to show a number of the software components of the exemplary distributed system 100. Computer 102 includes a memory 202, a secondary storage device 204, a central processing unit (CPU) 206, an input device 208, and a video display 210. The memory 202 includes a lookup service 212, a discovery server 214, and a Java runtime system 216. The Java runtime system 216 includes the Java remote method invocation system (RMI) 218 and a Java virtual machine (JVM) 220. RMI 218 facilitates the invocation of remote methods and JVM 220 acts like an abstract computing machine, receiving instructions from programs in the form of bytecodes and interpreting these bytecodes by dynamically converting them into a form for execution, such as object code and executing them. RMI 218 and JVM 220 are further described in the previously referenced application entitled "Dynamic Lookup Service in a Distributed System."

The lookup service 212 defines the services that are available for a particular Djinn. The lookup service 212 contains one object for each service within the Djinn, and each object contains various methods that facilitate access to the corresponding service. The lookup service 212 is described in greater detail in the previously referenced application entitled "Dynamic Lookup Service in a Distributed System."

The discovery server 214 detects when a new device is added to the exemplary distributed system 100, during a process known as boot and join (or discovery), and when such a new device is detected, the discovery server passes a reference to the lookup service 212 to the new device, so that the new device may register its services with the lookup service and become a member of the Djinn. After the device discovers the lookup service 212, the device may access any of the services registered with the lookup service 212.

Furthermore, the device may also advertise its own services by registering with the lookup service 212. Once registered, the services provided by the device may be accessed through the lookup service 212, by all other entities that also discover lookup service 212. The process of boot and join is described in greater detail in the previously referenced application entitled "Apparatus and Method for providing Downloadable Code for Use in Communicating with a Device in a Distributed System."

Figure 3B:
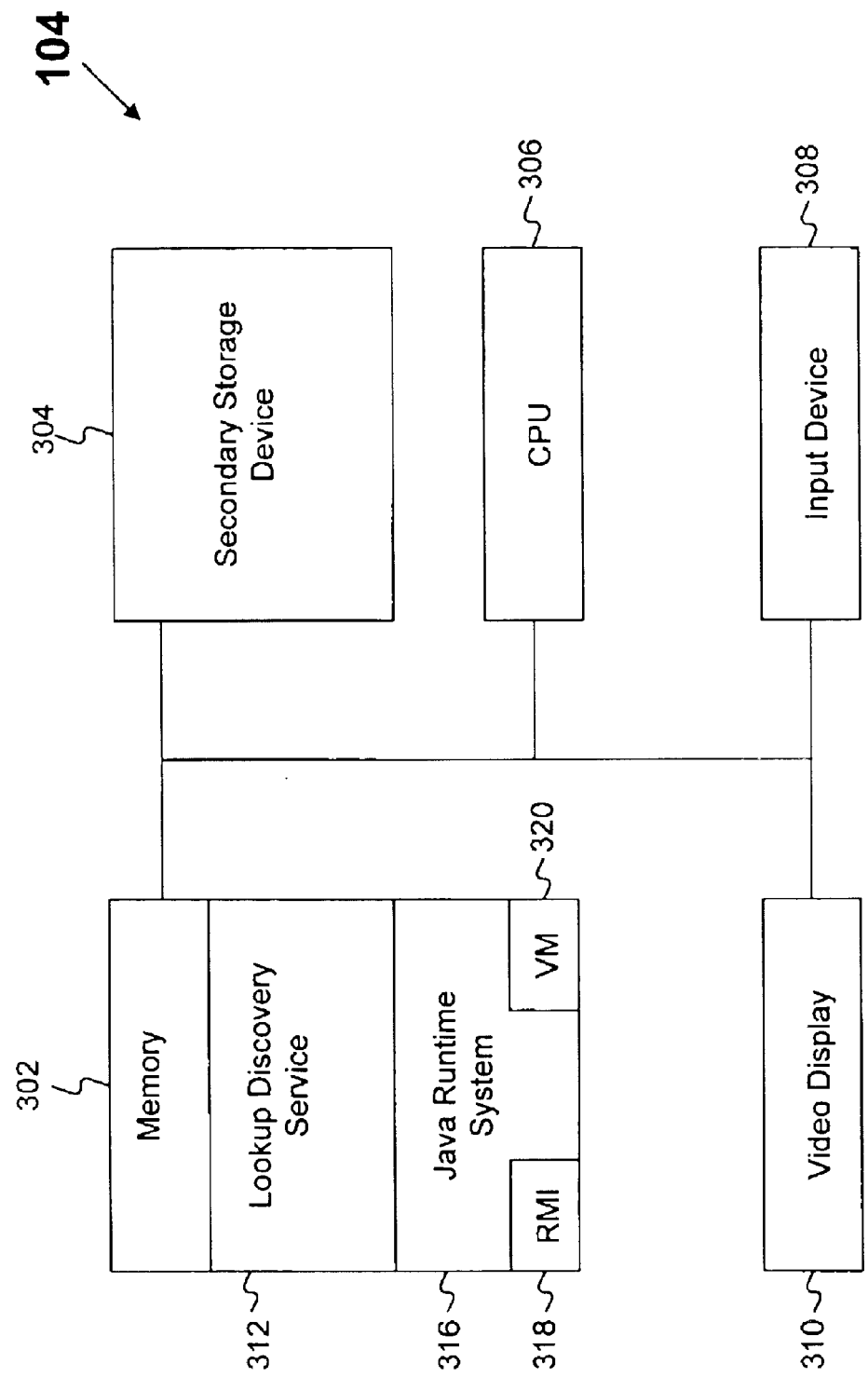
FIG. 3b depicts a more detailed block diagram of a lookup discovery computer depicted in FIG. 2.

FIG. 3b depicts the computer 104 in greater detail to show a number of the software components of the exemplary distributed system 100. Like server computer 102, computer 104 includes a memory 302, secondary storage device 304, CPU 306, input device 308, video display 310, and Java runtime system 316. Lookup discovery service 312 is comprised of a helper service class that any computer 104 or 102 can use to discover services, and register for event notification. A helper service is a programming component that can be used during construction of Jini services and/or clients. Helper services are typically remote. In other words, their methods execute on remote hosts. Consequently, they register with a lookup service and they are looked up by devices wishing to employ them.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM either currently known or later developed. Sun, Sun Microsystems, the Sun Logo, Java, and Java-based trademarks are trademarks or registered trademarks of Sun Microsystems, Inc. in the United States and other countries.

Lookup Discovery Service

The lookup discovery service may be implemented as a well-behaved Jini service, complying with all of the policies embodied in the Jini technology programming model. It defines the interface through which other Jini services and clients may request that discovery processing be performed on their behalf. When an entity registers with the lookup discovery service a proxy is returned. Through the returned proxy the entity may manage the parameters reflected in the entity's registration with the lookup discovery service.

TABLE 1

```
package net.jini.discovery;
{
    public interface LookupDiscoveryService
        public LookupDiscoveryRegistration register
            (String[ ] groups,
            LookupLocator[ ] locators,
            RemoteEventListener listener,
            MarshalledObject handback,
            long leaseDuration)
                throws RemoteException;
}
```

As seen from the lookup discovery interface shown in Table 1, when requesting a registration with the lookup discovery service, the client indicates the lookup services it is interested in discovering by submitting two sets of objects. Each set may contain zero or more elements. One set comprises the names of the groups whose members are lookup services the client wishes to be discovered. The other set comprises LookupLocator objects, each corresponding to a specific lookup service the client wishes to be discovered.

For each successful registration, the lookup discovery service will manage both the set of group names and the set of locators submitted. For the purposes of this document, these sets will be referred to as the managed set of groups, and the managed set of locators respectively. The managed set of groups associated with a particular registration contains the names of the groups whose members consist of lookup services the client wishes to be discovered through multicast discovery. Similarly, the managed set of locators contains instances of LookupLocator, each corresponding to a specific lookup service the client wishes to be discovered through unicast discovery. The references to the lookup services that have been discovered will be maintained in a set referred to as the managed set of lookup services (or managed set of registrars). Note that when the general term managed set is used, it should be clear from the context whether groups, locators or registrars are being discussed. Furthermore, it is understood that when the term "group discovery" or "locator discovery" is used, it should be taken to mean the employment of the multicast discovery protocol or the unicast discovery protocol, respectively to discover lookup services that correspond to members of the appropriate managed set.

Figure 4:
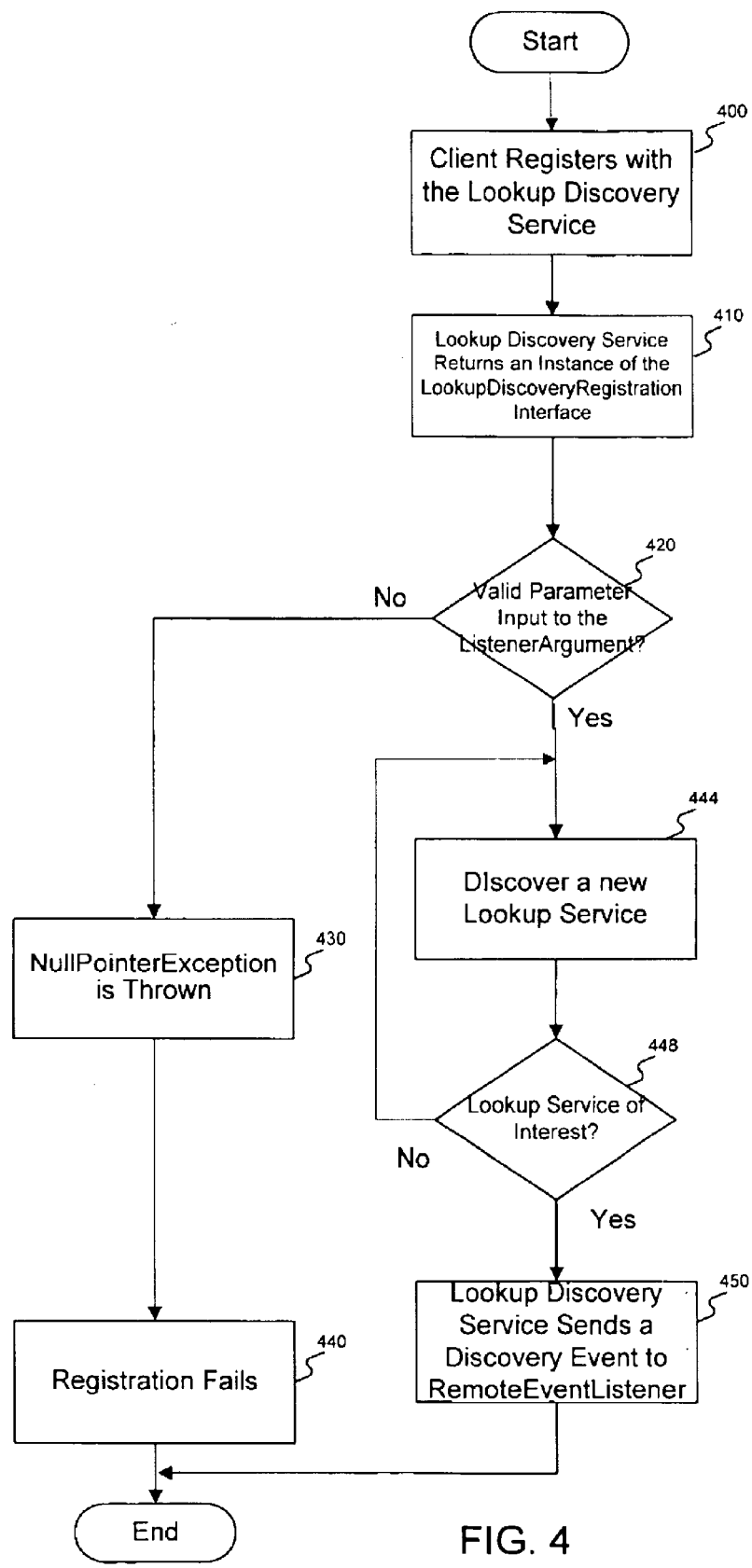
FIG. 4 depicts a flowchart of the registration procedure in accordance with the present invention.

Now referring to FIG. 4, in order to employ the lookup discovery service to perform discovery on its behalf, a client must first register (step 400). Clients register with the lookup discovery service by invoking the register method defined in the lookup discovery service interface (Table 1). As seen in Table 1, the register method is the only method specified by this interface. An invocation of the register method produces an object—referred to as a registration object (or simply, a registration)—that is mutable. That is, the object produced contains methods through which the object may be changed. Because of this, each invocation of the register method produces a new registration object. Thus, the register method is not idempotent. Referring to Table 1, it is shown that the register method takes the following arguments as input: a String array, none of whose elements may be null, comprising zero or more names of the groups to which the desired lookup services belong; an array of zero or more (non-null) LookupLocator objects, each corresponding to a specific lookup service the client wishes to be discovered; a RemoteEventListener object which specifies the entity that will receive events notifying the registration of the discovery of lookup services of interest; an instance of MarshalledObject which specifies an object that will be included in the notification event that the lookup discovery service sends to the registered listener; and a long value representing the amount of time (in milliseconds) for which the resources of the lookup discovery service are being requested. It is important to note that the entity that receives such an event notification does not have to be a client of the lookup discovery service, it may be any third party event handling service.

As shown in step 410 of FIG. 4, the register method returns an instance of the LookupDiscoveryRegistration interface. It is through this return object that the client interacts with the lookup discovery service. This interaction includes activities such as group and locator management, state retrieval, and requesting the re-discovery of previously discovered but unavailable ("discarded") lookup services. The semantics of the methods of the LookupDiscoveryRegistration interface are defined in the next section. A client's registration with the lookup discovery service is persistent across restarts (crashes) of the lookup discovery service, until the lease expires or is canceled.

The groups argument shown in Table 1 takes a String array of non-null elements. A null reference (LookupDiscovery.ALL_GROUPS) may however be input to this argument. If null is input, the lookup discovery service will attempt to discover all lookup services located within the multicast radius of the host on which the lookup discovery service is running. On the other hand, if an empty array (LookupDiscovery.NO_GROUPS) is input, then group discovery (multicast) for that registration will not be performed until the client, through one of the registration's methods, populates the managed set of groups.

As with the groups argument, the locators argument takes a String array, none of whose elements may be null. If either the empty array or null is input to the locators argument, then locator discovery for the registration will not be performed until the client through one of the registration's methods, populates the managed set of locators.

Upon discovery of a lookup service, through either group discovery or locator discovery, the lookup discovery service as shown in step 420 will send an event, referred to as a discovery event, to the listener associated with the registration produced by the call to register. A valid parameter must be input to the listener argument of the register method. If null is input to this argument, then a NullPointerException will be thrown and the registration fails. The state information maintained by the lookup discovery service includes the set of group names, locators and listeners submitted by each client through each invocation of the register method, with duplicates eliminated. This state information contains no knowledge of the clients that register with the lookup discovery service. Thus, there is no requirement that a client identify itself during the registration process. For each registration created by the lookup discovery service, an event identifier will be generated that uniquely maps the registration to the set of groups and locators, as well as to the listener, submitted to the registration request. This event identifier is returned through the returned registration object, and is unique across all other active registrations with the lookup discovery service.

As shown in step 444, the lookup discovery service continuously searches for new lookup services. When it finds a new service, process flows to step 448, where the process determines whether the lookup service is "of interest" to one of its clients. If it is, the lookup discovery service sends a RemoteDiscoveryEvent, containing the appropriate event identifier, to the listener corresponding to each such registration. If the lookup service is not of interest, process flows back to step 444 and the lookup discovery service goes back to performing discovery-related activities. Once an event signaling the discovery of a desired lookup service (by group or by locator) has been sent, no other discovery events for that lookup service will be sent to a registration's listener until the lookup service is discarded (through that registration) and then re-discovered. Note that a detailed definition of the process that occurs when the lookup discovery service discards a lookup service is presented later in this document. If, between the time a lookup service is discarded (through any registration) and the time it is re-discovered, a new registration is requested having parameters referencing that lookup service, then upon re-discovery of the lookup service an event will also be sent to that new registration's listener.

As shown in Table 1, when requesting a registration with the lookup discovery service, a client may also supply a reference to an object, wrapped in a MarshalledObject, referred to as a handback. When the lookup discovery service sends an event to a registration's listener, the event sent will also contain a reference to this handback object. This object is known to the remote event listener and should contain any information that is needed by the listener to identify the event and to react to the occurrence of that event. The semantics of the object input to the handback argument are left to each client to define (null may be input to this argument.)

When a client registers with the lookup discovery service, it is effectively requesting a lease on the resources provided by that service. The initial duration of the lease granted to a client by the lookup discovery service will be less than or equal to the requested duration reflected in the value input to the leaseDuration argument. That value must be positive, Lease.FOREVER or Lease.ANY. If any other value is input to this argument, an IllegalArgumentException will be thrown. The client may obtain a reference to the Lease object granted by the lookup discovery service through the registration object returned by the service.

As stated earlier with respect to registering a client with the lookup discovery service, when a client requests a registration with a lookup discovery service, an instance of the LookupDiscoveryRegistration interface is returned. It is through this interface that the client manages the parameters reflected in the registration with the lookup discovery service. A typical LookupDiscoveryRegistration interface is shown in Table 2.

TABLE 2

```
package com.sun.jini.discovery;
public interface LookupDiscoveryRegistration
    {
        public EventRegistration getEventRegistration( );
        public Lease getLease( );
        public ServiceRegistrar[ ] getRegistrars( )
            throws RemoteException;
        public String[ ] getGroups( ) throws RemoteException;
        public LookupLocator[ ] getLocators( )
            throws RemoteException;
        public void addGroups(String[ ] groups)
            throws RemoteException;
        public void setGroups(String[ ] groups)
            throws RemoteException;
        public void removeGroups(String[ ] groups)
            throws RemoteException;
        public void addLocators(LookupLocator[ ] locators)
            throws RemoteException;
        public void setLocators(LookupLocator[ ] locators)
            throws RemoteException;
        public void removeLocators(LookupLocator[ ] locators)
            throws RemoteException;
        public void discard(ServiceRegistrar registrar)
            throws RemoteException;
    }
```

As with the lookup discovery service interface, this is not a remote interface. Each implementation of the lookup discovery service exports proxy objects that implement this interface local to the client, using an implementation-specific protocol to communicate with the actual remote server. All of the proxy methods must obey normal RMI remote interface semantics except where explicitly noted.

The discovery facility of the lookup discovery service, together with its event mechanism, make up the set of resources clients register to use. Because the resources of the lookup discovery service are leased, access is granted for only a limited period of time, unless there is an active expression of continuing interest on the part of the client. When a client, through the registration process, requests that a lookup discovery service perform discovery of a set of desired lookup services, the client is also registered with the service's event mechanism. Because of this, the lookup discovery service "bundles" both resources under a single lease. When that lease expires, both discovery processing and event notifications will cease with respect to the registration that resulted from the client's request. To facilitate lease management and event handling, this interface defines methods which allow the client to retrieve its event registration information. Additional methods defined by this interface allow the client to retrieve references to the set of currently discovered lookup services, as well as to modify the managed sets of groups and locators. If the client's registration with the lookup discovery service has expired or been canceled, then any invocation of a remote method defined in this interface will result in a NoSuchObjectException. The methods defined by this interface are organized into a set of accessor methods, a set of group modification methods, a set of locator modification methods and the discard method. Through the accessor methods various elements of a registration's state can be retrieved. The modification methods provide a mechanism for changing the set of groups and locators to be discovered for the registration. Through the discard method a particular lookup service may be made eligible for re-discovery.

The getEventRegistration method returns an EventRegistration object that encapsulates the information needed by the client to identify a notification sent by the lookup discovery service to the registration's listener. This method is not remote and it takes no arguments.

The getLease method returns the Lease object that controls a client's registration with the lookup discovery service. It is through the object returned by this method that the client requests the renewal or cancellation of the registration with the lookup discovery service. This method is not remote, nor does it take any arguments.

Note that the object returned by the getEventRegistration method also provides a getLease method. The getEventRegistration and the getLease method defined by the LookupDiscoveryRegistration interface both return the same Lease object. The getLease method defined here is provided as a convenience to avoid the indirection associated with the getLease method on the EventRegistration object, as well as to avoid the overhead of making two method calls.

The getRegistrars method returns an array containing references to each lookup service that has already been discovered for the registration. Client's can employ this method to determine if an event containing a discovered lookup service was sent to the registration's listener, but was missed (i.e., was never received) by the listener.

The getGroups method returns an array comprising the group names from the registration's managed set. If the managed set of groups is empty, this method returns the empty array. If there is no managed set of groups associated with the registration, then null is returned.

The getLocators method returns an array comprising the LookupLocator objects from the registration's managed set. If the managed set of locators is empty; this method returns the empty array. If there is no managed set of locators associated with the registration, then null is returned.

With respect to a particular registration, the groups to be discovered may be modified using the methods described below. In each case, a set of groups is represented as a String array, none of whose elements may be null. The empty set is denoted by the empty array (LookupDiscovery.NO_GROUPS), and "no set" is indicated by null (LookupDiscovery.ALL_GROUPS). No set indicates that all lookup services within the multicast radius should be discovered. With respect to any set of the group names input to these methods, duplicated group names reflected in the input will be ignored.

The addGroups method adds a set of group names to the registration's managed set. This method takes one argument as input: a String array comprising the set of group names with which to augment the managed set. Elements in the input set that duplicate elements already in the managed set will be ignored. Once a new name has been added to the managed set, the lookup discovery service will attempt to discover all (as yet) undiscovered lookup services that are members of the group having that name. This method throws an UnsupportedOperationException if the registration has no current managed set of groups to augment. If null is input, this method throws a NullPointerException. If the empty array is input, then the registration's managed set of groups will not change.

The setGroups method replaces all of the group names in the registration's managed set with names from a new set. This method takes one argument as input: a String array comprising the set of new group names that will replace the set of names in the managed set. Once a new group name has been placed in the managed set, if there are lookup services belonging to that group that have already been discovered, no event will be sent to the registration's listener for those particular lookup services. Attempts to discover all (as yet) undiscovered lookup services belonging to that group will continue to be made for the registration. If null is input to setGroups, then the lookup discovery service will attempt to discover all (as yet) undiscovered lookup services located within the multicast radius and, upon discovery of any lookup service, will send to the registration's listener an event signaling that discovery. If the empty array is input, then group discovery for the registration will cease.

The removeGroups method deletes a set of group names from the registration's managed set. This method takes one argument as input: a String array containing the set of group names to remove. This method throws an UnsupportedOperationException if the registration has no current managed set of groups from which to remove elements. If null is input, this method throws a NullPointerException. If the empty array is input, then the registration's managed set of groups will not change.

After a set of groups has been removed from the managed set because of an invocation of either setGroups or removeGroups, attempts to discover any lookup service that satisfies each of the following characteristics will cease to be made for the registration: (1) the lookup service is a member of one or more of the groups that was removed from the registration's managed set; (2) the lookup service is not a member of any group in the new managed set resulting from the invocation of setGroups or removeGroups; and (3) the lookup service does not correspond to any element in the registration's managed set of locators.

With respect to a particular registration, the locators to be discovered may be modified using the methods described below. In each case, a set of locators is represented as an array of LookupLocator objects, none of whose elements may be null. With respect to any set of locators input to these methods, duplicated locators (as determined by LookupLocator.equals) will be ignored. The addLocators method adds a set of LookupLocator objects to the registration's managed set. This method takes one argument as input: an array comprising the set of locators with which to augment the managed set. Elements in the input set that duplicate (using LookupLocator.equals) elements already in the managed set will be ignored. This method throws an UnsupportedOperationException if the registration has no managed set of locators to augment. If null is input to addLocators, a NullPointerException will be thrown. If the empty array is input, the registration's managed set of locators will not change.

The setLocators method replaces all of the locators in the registration's managed set with LookupLocator objects from a new set. This method takes one argument as input: an array comprising the set of locators that will replace the locators in the managed set. If null is input to setLocators, a NullPointerException will be thrown. If the empty array is input, all locator discovery performed by the lookup discovery service, for the registration, will cease.

The removeLocators method deletes a set of LookupLocator objects from the registration's managed set. This method takes one argument as input: an array containing the set of locators to remove. This method throws an UnsupportedOperationException if the registration has no managed set of locators from which to remove elements. If null is input to removeLocators, a NullPointerException will be thrown. If the empty array is input, the registration's managed set of locators will not change.

Whenever a new locator is placed in the managed set as a result of an invocation of one of the methods above, the lookup discovery service will attempt unicast discovery of the lookup service associated with the new locator. It is important to note that discovery will not be attempted if the new locator equals any locator corresponding to the previously discovered lookup services (across all registrations); where equality is determined by the equals method of LookupLocator.

Figure 5:
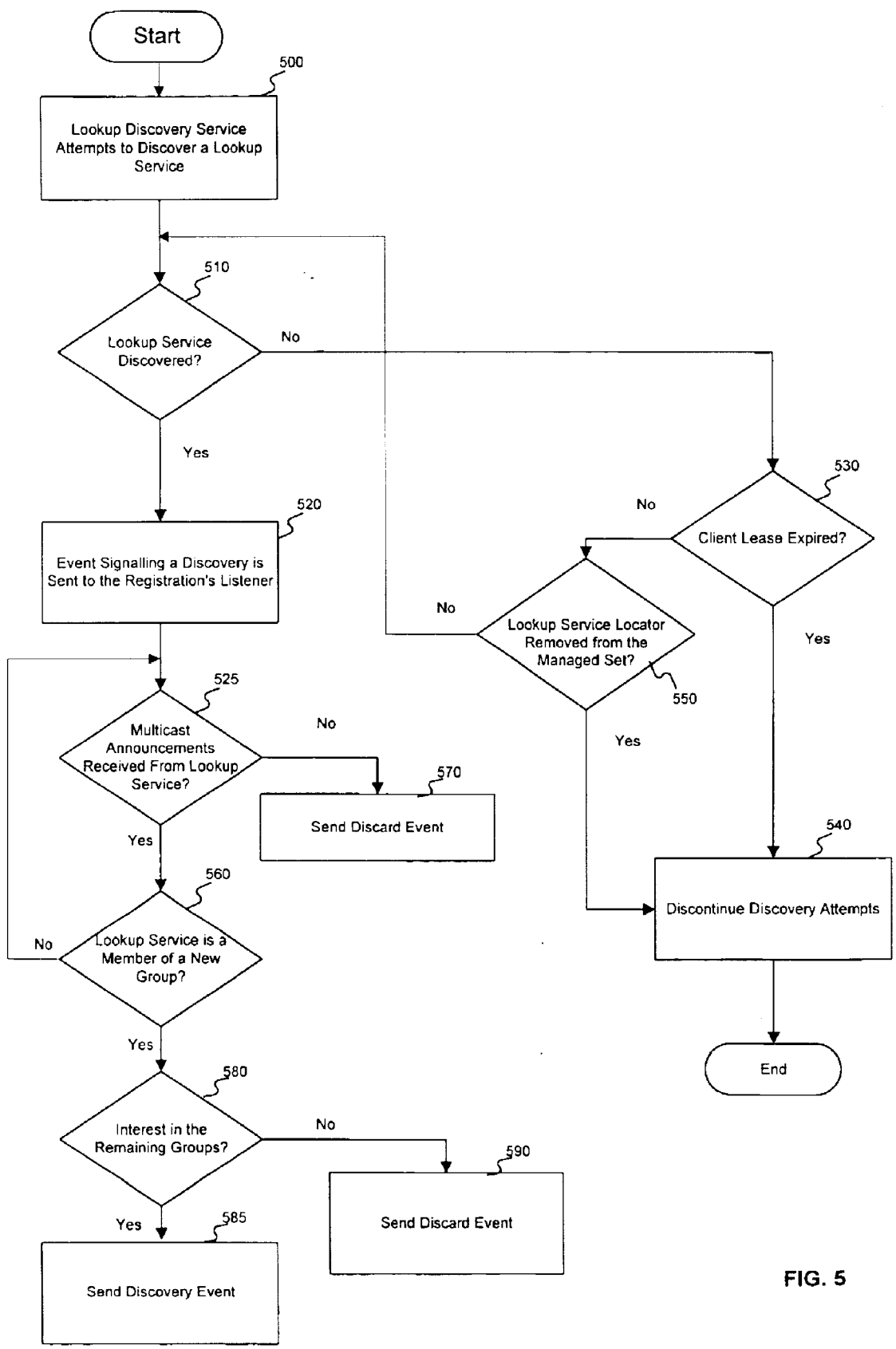
FIG. 5 depicts a flowchart of the discovery process in accordance with the present invention.

As shown in FIG. 5, when discovery is attempted (step 500), the discovery attempt will be repeated until one of the following events occurs: the lookup service is discovered (step 510); the client's lease expires (step 530); or the client explicitly removes the locator from the managed set (step 550). Upon discovery of the lookup service corresponding to the new locator or upon finding a match with a previously discovered lookup service, an event signaling a discovery will be sent to the registration's listener as shown in step 520.

Figure 6:
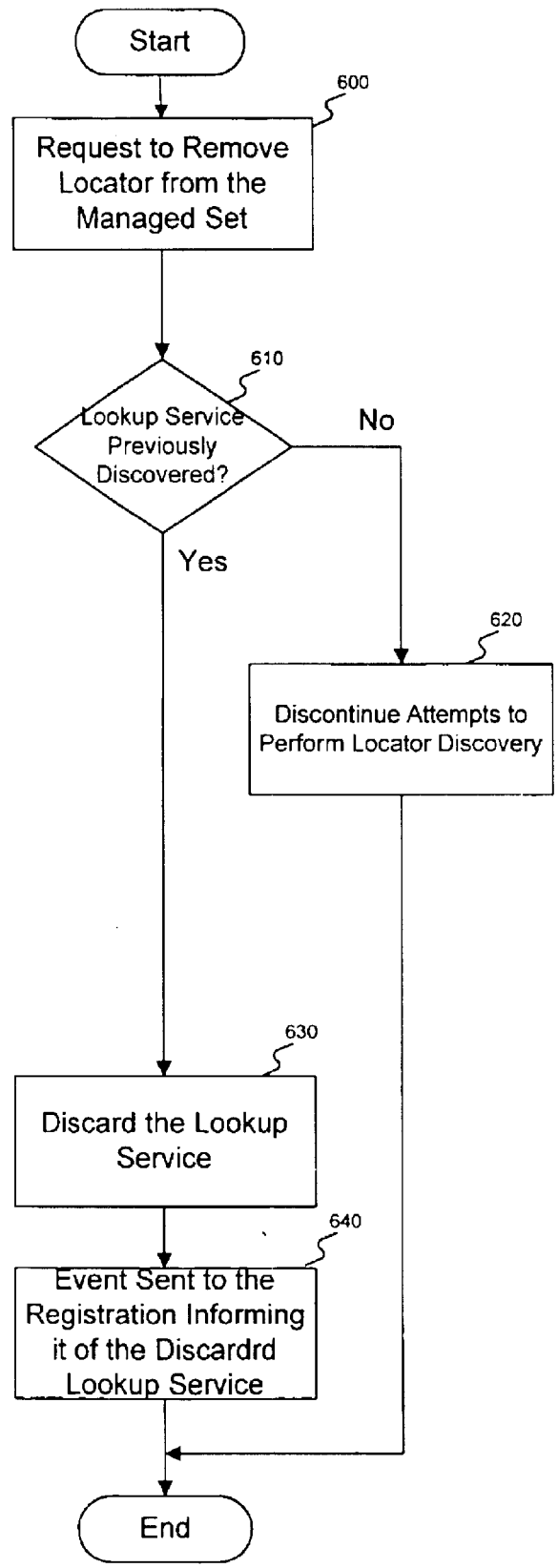
FIG. 6 depicts a flowchart of the removal process in accordance with the present invention.

After initial discovery of a lookup service, the lookup discovery service will continue to monitor the state of the multicast announcements from that lookup service (step 525). Depending on the state of those announcements, the lookup discovery service may send either a discovery event or an event referred to as a discard event (FIG. 6). A discovery event will be sent (step 585) in the event that the multicast announcements from the already discovered lookup service indicate that the lookup service is a member of a new group (step 560) and at least one registration has registered interest in one or more of the new groups (step 580).

A discard event, on the other hand, will be sent upon the occurrence of one of the following events:

in response to a discard request resulting from an invocation of a registration's discard method;

when a lookup service is removed from a registration's managed set in response to an invocation of either setLocators or removeLocators;

when multicast announcement from an already-discovered lookup service are no longer being received (step 570);

when multicast announcements from an already discovered lookup service indicate that the lookup service is no longer a member of one or more of the groups reflected in its previous multicast announcements, and there is no interest in any of the remaining groups, reflected in those announcements (step 590).

As shown in FIG. 6, when an existing locator is removed from the managed set as a result of an invocation of one of the methods above, the action taken by the lookup discovery service depends on whether the lookup service corresponding to that locator had been previously discovered for the registration. First, as shown in step 600, a request is received to remove a lookup service from the managed set. If the lookup service associated with the locator was previously discovered, processing flows to step 630 and the lookup service will be discarded. Next, in step 640, an event is sent to the registration notifying it that the lookup service has been discarded. If, in step 610, it is determined that the lookup service has yet to be discovered, processing flows to step 620 where the system discontinues attempts to perform further locator discovery of that particular lookup service. Even though a lookup service that has not yet been discovered, does not actually need to be discarded, the system must nonetheless discontinue attempts to discover the unavailable lookup service.

When the lookup discovery service removes an already-discovered lookup service from a registration's managed set(s), making the lookup service eligible for re-discovery, the lookup service is considered to be discarded. Whenever the lookup discovery service discards a lookup service, it will send an event to the registration to notify it that the lookup service has been discarded.

The discard method provides a mechanism for registered clients to inform the lookup discovery service of the existence of an unavailable lookup service; and to request that the lookup discovery service discard that lookup service. The discard method takes a single argument as input: the proxy to the lookup service to discard. This method takes no action if the proxy input to this method equals none of the proxies reflected in the managed set.

In the event that a lookup service goes down or for some reason is unavailable, there will be no automatic notification of the occurrence of such an event. This means that for each of the registration's targeted lookup services, after a lookup service is initially discovered, the lookup discovery service will not attempt to discover that lookup service again (for that registration) until it is discarded. When a client determines that a discovered lookup service is no longer available, it is the responsibility of the client to inform the lookup discovery service—through the invocation of the registration's discard method—that the previously discovered lookup service is no longer available; and that attempts should be made to re-discover that lookup service for the registration. Typically, a client determines that a lookup service is unavailable when the client attempts to use the lookup service but receives a non-fatal exception or error (e.g., RemoteException) as a result of the attempt.

The lookup discovery service can act on behalf of numerous clients having access to the same lookup service. If that lookup service becomes unavailable, many of those clients may invoke discard between the time the lookup service becomes unavailable and the time it is re-discovered. Upon the first invocation of discard, the lookup discovery service will reinitiate discovery of the relevant lookup service for the registration of the client that made the invocation. For all other invocations made prior to re-discovery, the registrations through which the invocation is made are added to the list of registrations that will be notified when re-discovery of the lookup service does occur. That is, upon re-discovery of the lookup service, only those registrations through which this method is invoked will be notified.

While the present invention has been described in connection with an exemplary embodiment, it will be understood that many modifications will be readily apparent to those skilled in the art, and this application is intended to cover any adaptations or variations thereof. For example, different labels or definitions for the multicast packet may be used without departing from the scope of the invention. This invention should be limited only by the claims and equivalents thereof.

What is claimed is:

1. A method in a data processing system having a plurality of lookup services each having associated services, the method comprising the steps of:

receiving a request by a lookup discovery service to identify a lookup service from among the plurality of lookup services with which a service of interest to a client is associated, the request including a service characteristic of interest to the client and a time period;

locating, during the time period, by the lookup discovery service, said lookup service using the service characteristic of interest to the client;

returning locator information that facilitates access to said lookup service of interest to the client; and when a lookup service is located, transmitting the request to the located lookup service.

2. The method of claim 1, wherein the receiving step includes the step of receiving a request to register with the lookup discovery service.

3. The method of claim 1, wherein the transmitting step includes the step of transmitting a multicast packet comprising a request to access the lookup service.

4. The method of claim 1, wherein the transmitting step further includes the step of transmitting a unicast packet comprising a request to access a lookup service.

5. The method of claim 1 further comprising the steps of:

receiving lookup service locator information by the lookup discovery service; and transmitting the locator information to a client.

6. A method in a data processing system having a client, a lookup discovery service and a plurality of lookup services each with associated characteristics and services, the method comprising the steps of:

transmitting a request by a client to a lookup discovery service to return locator information for a desired lookup service from among the plurality of lookup services with which a service of interest to the client is associated, the request including a characteristic of the desired lookup service;

receiving the request by the lookup discovery service;

locating, as a function of the characteristic of the desired lookup service, a lookup service; and transmitting the request to the located lookup service.

7. The method of claim 6 further comprising the steps of:

receiving the locator information by the lookup discovery service; and transmitting the locator information to the client.

8. The method of claim 6, wherein the first transmitting step is further comprised of the step of transmitting a request to register with the lookup discovery service.

9. The method of claim 6, wherein the second transmitting step is further comprised of the step of transmitting a multcast packet from the lookup discovery service to the plurality of lookup services.

10. The method of claim 9, further comprising of the step of receiving locator information by the lookup discovery service that facilitates access to a plurality of lookup services.

11. The method of claim 6, wherein the first transmitting step further includes the step of transmitting a multicast packet to the lookup discovery service.

12. The method of claim 6, wherein the first transmitting step further includes the step of transmitting a unicast packet to the lookup discovery service.

13. A method in a data processing system having a client computer, a lookup discovery service for accessing associated lookup services, and a lookup service containing service stubs for accessing associated services, the method comprising the steps of:

transmitting a request by a client to provide locator information for a lookup service, the request including a characteristic of a desired lookup service of interest to the client, receiving the request by the lookup discovery service;

locating, by the lookup discovery service, a lookup service matching the characteristic of the desired lookup service of interest to the client until a time period previously specified by the client expires;

transmitting the request to the located lookup service of interest to the client;

returning the locator information of the lookup service of interest to the client; and transmitting said locator information from the lookup discovery service to the client.

14. The method of claim 13 wherein the first transmitting step includes the step of transmitting a request for a plurality of lookup services.

15. The method of claim 13 wherein the returning step further includes the step of returning lookup service locator information for a plurality of lookup services.

16. The method of claim 13 wherein the returning step includes the step of returning the null value if no lookup service satisfying the client's request is found.

17. A distributed system with a plurality of services, comprising:

a first server computer having a memory containing a lookup discovery service for facilitating access to at least a second server computer;

a plurality of second server computers each having a memory containing a lookup service having stubs for facilitating access to a plurality of services and having a processor for running the lookup service; and a client computer having a memory containing a program that transmits a request to the first server computer, the request including a characteristic of lookup services that interest the program and a time period, and having a processor for running the program;

wherein the first server receives the request from the client computer, searches for lookup services that match the characteristic during the time period, and then transmits the request to at least one of the plurality of second server computers that include lookup services found to match the characteristic.

18. A system having a first computer with a client and a plurality of second computers each with a lookup service containing stubs used for accessing associated services and a third computer with a lookup discovery service containing lookup service locator information for facilitating access to a plurality of lookup services, the system comprising:

means for sending a request by the client to the lookup discovery service for access to a service meeting criteria specified in the request;

means for receiving the request by the lookup discovery service;

means for searching for lookup services with associated service that meets the criteria;

means for transmitting the client request to at least one of the lookup services with associated service that meets the criteria;

means for returning locator information corresponding to the lookup services with associated service that meets the criteria; and means for receiving locator information by the client.

19. A computer-readable medium containing instructions for controlling a data processing system to perform a method for locating a lookup service with associated characteristics and services, the method comprising the following steps:

receiving a request by a lookup discovery service to return locator information that facilitates access to a lookup service of interest to a client from among a plurality of lookup services, the request including a characteristic of a lookup service that interests the client, repeatedly searching, be the lookup discovery service, for lookup services that match the characteristic of the lookup service that interests the client; and when a lookup service that matches the characteristic is located, transmitting the request to the located lookup service.

20. The computer-readable medium of 19, wherein the method further comprises the step of receiving a request to register with the lookup discovery service.

21. The computer-readable medium of claim 19, wherein the transmitting step further includes the step of transmitting a multicast packet comprising a request to access the lookup service.

22. The computer-readable medium of claim 19, wherein the transmitting step further includes the step of transmitting a unicast packet comprising a request to access the lookup service.

23. The computer-readable medium of claim 19 further comprising the following steps of:

receiving lookup service locator information by the lookup discovery service; and transmitting the locator information to a client.

24. A computer-readable medium containing instructions for controlling a data processing system to perform a method for accessing lookup services each having associated characteristics and services, the method comprising the steps of:

transmitting a request by a client to a lookup discovery service to return locator information for a desired lookup service from among a plurality of lookup services, the request including a characteristic of the desired lookup service;

receiving the request by the lookup discovery server service;

searching, by the lookup discovery service, until a lookup service matching the characteristic is found, and transmitting the request to the lookup service matching the characteristic.

25. The computer-readable medium of claim 24, further comprising the following steps of:

receiving lookup service locator information by the lookup discovery service; and transmitting the lookup service locator information to a client.

26. The computer-readable medium of claim 24, wherein the first transmitting step is further comprised of the step of transmitting a request to register with the lookup discovery service.

27. The computer-readable medium of claim 24, wherein the second transmitting step is further comprised of the step of transmitting a multicast packet from the lookup discovery service to said at least one of a plurality of lookup services.

* * * * *

UNITED STATES PATENT AND TRADEMARK OFFICE
CERTIFICATE OF CORRECTION

PATENT NO. : 6,845,393 B1
DATED : January 18, 2005
INVENTOR(S) : Brian T. Murphy and Robert W. Scheifler It is certified that error appears in the above-identified patent and that said Letters Patent is hereby corrected as shown below:

Column 15,
Line 62, "multcast" should read -- multicast --.
Line 64, "comprising of the" should read -- comprising the --.

Column 17,
Line 20, "be" should read -- by --.
Line 26, "of 19," should read -- of claim 19, --.

Column 18,
Line 15, delete "server".

Signed and Sealed this

Seventeenth Day of May, 2005

JON W. DUDAS
*Director of the United States Patent and Trademark Office*